(12) United States Patent
Jain et al.

(10) Patent No.: US 9,247,567 B2
(45) Date of Patent: Jan. 26, 2016

(54) METHODS AND APPARATUS FOR PROVIDING SILENCE PERIODS IN DIRECTIONAL COMMUNICATIONS NETWORKS

(75) Inventors: Avinash Jain, San Diego, CA (US); Hemanth Sampath, San Diego, CA (US); Mohammad H. Taghavi Nasrabadi, San Diego, CA (US); Santosh P. Abraham, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 772 days.

(21) Appl. No.: 12/790,427

(22) Filed: May 28, 2010

(65) Prior Publication Data
US 2011/0122849 A1 May 26, 2011

Related U.S. Application Data

(60) Provisional application No. 61/263,230, filed on Nov. 20, 2009, provisional application No. 61/263,915, filed on Nov. 24, 2009.

(51) Int. Cl.
*H04B 7/00* (2006.01)
*H04W 74/08* (2009.01)
(Continued)

(52) U.S. Cl.
CPC .......... *H04W 74/0808* (2013.01); *H04W 16/28* (2013.01); *H04W 84/18* (2013.01)

(58) Field of Classification Search
CPC . H04W 16/28; H04W 84/18; H04W 52/0216; H04W 52/0219; H04W 52/0245; H04W 74/06; H04W 74/0808

USPC ......................................................... 455/509
See application file for complete search history.

(56) References Cited

U.S. PATENT DOCUMENTS

| 5,617,412 A | 4/1997 | Delprat et al. |
| 5,708,975 A | 1/1998 | Heiskari et al. |
| 5,917,446 A | 6/1999 | Greenspan |

(Continued)

FOREIGN PATENT DOCUMENTS

| CN | 1129508 A | 8/1996 |
| JP | 2002237774 A | 8/2002 |

(Continued)

OTHER PUBLICATIONS

International Search Report and Written Opinion—PCT/US2010/057333, International Search Authority—European Patent Office—Feb. 18, 2011.

(Continued)

*Primary Examiner* — Ajibola Akinyemi
(74) *Attorney, Agent, or Firm* — Steven R. Thiel

(57) ABSTRACT

A method of facilitating a silence period in a directional communication network is provided. The method may comprise initiating, by a first apparatus, a listening period mode, wherein the listening period mode comprises ceasing at least a portion of current communication and configuring the first apparatus to receive a request to initiate a new communication, determining whether a request is received during a time period in the listening period mode, and transmitting a response if the request to initiate the new communication is received during the time period in the listening period mode.

56 Claims, 9 Drawing Sheets

(51) Int. Cl.
*H04W 16/28* (2009.01)
*H04W 84/18* (2009.01)

(56) References Cited

U.S. PATENT DOCUMENTS

| | | | |
|---|---|---|---|
| 6,463,307 | B1* | 10/2002 | Larsson et al. ............... 455/574 |
| 8,116,405 | B2* | 2/2012 | Cho et al. ..................... 375/316 |
| 8,175,109 | B2* | 5/2012 | Nogueira-Nine . H04W 52/0219 370/447 |
| 2005/0068934 | A1* | 3/2005 | Sakoda ............... H04W 48/08 370/350 |
| 2006/0142034 | A1* | 6/2006 | Wentink et al. ............... 455/515 |
| 2007/0206533 | A1 | 9/2007 | Wiatrowski et al. |
| 2007/0271387 | A1* | 11/2007 | Lydon ................ G06F 1/3209 709/230 |
| 2008/0153502 | A1* | 6/2008 | Park ..................... H04W 8/005 455/446 |
| 2010/0265925 | A1* | 10/2010 | Liu et al. ...................... 370/336 |

FOREIGN PATENT DOCUMENTS

| | | |
|---|---|---|
| JP | 2005117165 A | 4/2005 |
| WO | 2004073257 A2 | 8/2004 |
| WO | 2004073263 A1 | 8/2004 |

OTHER PUBLICATIONS

Zhang Z., et al., "Neighbor discovery in mobile ad hoc self-configuring networks with directional antennas: algorithms and comparisons", IEEE Transactions on Wireless Communications, May 2008, vol. 7, No. 5, pp. 1540-1549.

* cited by examiner

METHODS AND APPARATUS FOR PROVIDING SILENCE PERIODS IN DIRECTIONAL COMMUNICATIONS NETWORKS

CROSS-REFERENCE TO RELATED APPLICATION(S)

The present application for patent claims priority to Provisional Application No. 61/263,230, entitled "Methods and Apparatus for Providing Silence Periods in Directional Communications Networks," filed Nov. 20, 2009,and Provisional Application No. 61/263,915, entitled "Methods and Apparatus for Providing Silence Periods in Directional Communications Networks," filed Nov. 24, 2009 the content of which are expressly incorporated by reference herein.

BACKGROUND

1. Field of the Invention

The present disclosure relates generally to communication systems, and more particularly, to provide a silence period in a directional communication network.

2. Background

In order to address issues associated with increasing bandwidth usage that may be seen in wireless communications systems, different schemes have been developed to allow multiple user terminals to communicate by sharing channel resources while achieving high data throughputs. Multiple Input or Multiple Output (MIMO) technology represents one such approach that has recently emerged as a popular technique for the next generation communication systems. MIMO technology has been adopted in several emerging wireless communications standards such as the Institute of Electrical Engineers (IEEE) 802.11 standard. IEEE 802.11 denotes a set of Wireless Local Area Network (WLAN) air interface standards developed by the IEEE 802.11 committee for short-range communications (e.g., tens of meters to a few hundred meters). For example, 802.11 ad/ac/a/b/g/n.

Generally, wireless communications systems, specified by the IEEE 802.11 standard, have a central entity, such as an access point (AP)/point coordination function (PCF) that manages communications between different devices, also called stations (STAs). Having a central entity may simplify design of communication protocols. Further, although any device capable of transmitting a beacon signal may serve as an AP, for an AP to be effective it may have to have a good link quality to all STAs in a network.

Referring to one example device (e.g., STA), a mobile wireless communications devices (WCD) (e.g., laptops, smartphones, etc.) may have comparatively reduced capabilities to that of a traditional AP due to factors such as cost, power, form factor, etc. For example, antenna steering capability may be limited to a small sector bound, available power may be limited, location may be variable, etc. Even with these limitations, STAs may be asked to perform as APs to form peer-to-peer networks for various purposes, such as side-loading, file sharing, etc. For example, STAs may be asked to form peer-to-peer networks where no device may efficiently transmit to and receive from all other devices. As such, a method and apparatus for providing effective directionally based communication schemes between multiple devices is desired.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In accordance with one or more aspects and corresponding disclosure thereof, various aspects are described in connection with providing a silence period in a directional communication network. According to one aspect, a method for facilitating a silence period in a directional communication network is provided. The method can comprise initiating, by a first apparatus, a listening period mode, wherein the listening period mode comprises ceasing at least a portion of current communication and configuring the first apparatus to receive a request to initiate a new communication. Further, the method can comprise determining whether a request is received during a time period in the listening period mode. Moreover, the method can comprise transmitting a response if the request to initiate the new communication is received during the time period in the listening period mode.

Another aspect relates to a computer program product comprising a computer-readable medium. The computer-readable medium can include code for initiating, by a first apparatus, a listening period mode, wherein the listening period mode comprises ceasing at least a portion of current communication and configuring the first apparatus to receive a request to initiate a new communication. Further, the computer-readable medium can include code for determining whether a request is received during a time period in the listening period mode. Moreover, the computer-readable medium can include code for transmitting a response if the request to initiate a new communication is received during the time period in the listening period mode.

Yet another aspect relates to an apparatus. The apparatus can comprise means for initiating, by a first apparatus, a listening period mode, wherein the listening period mode comprises ceasing at least a portion of current communication and configuring the first apparatus to receive a request to initiate a new communication. Still further, the apparatus can comprise means for determining whether a request is received during a time period in the listening period mode. Moreover, the apparatus can comprise means for transmitting a response if the request to initiate the new communication is received during the time period in the listening period mode.

Another aspect relates to a station. The station can include an antenna. Further, the station can include a processor coupled to the antenna, configured to: initiate, by a first apparatus, a listening period mode, wherein the listening period mode comprises ceasing at least a portion of current communication and configuring the first apparatus to receive a request to initiate a new communication, determine whether a request is received during a time period in the listening period mode, and transmit a response if the request to initiate the new communication is received during the time period in the listening period mode.

Another aspect relates to an apparatus. The apparatus can include a processing system configured to: initiate, by a first apparatus, a listening period mode, wherein the listening period mode comprises ceasing at least a portion of current communication and configuring the first apparatus to receive a request to initiate the new communication, determine whether a request is received during a time period in the listening period mode, and transmit a response if the request to initiate the new communication is received during the time period in the listening period mode.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

These and other sample aspects of the invention will be described in the detailed description that follow, and in the accompanying drawings, wherein.

Figure 1:
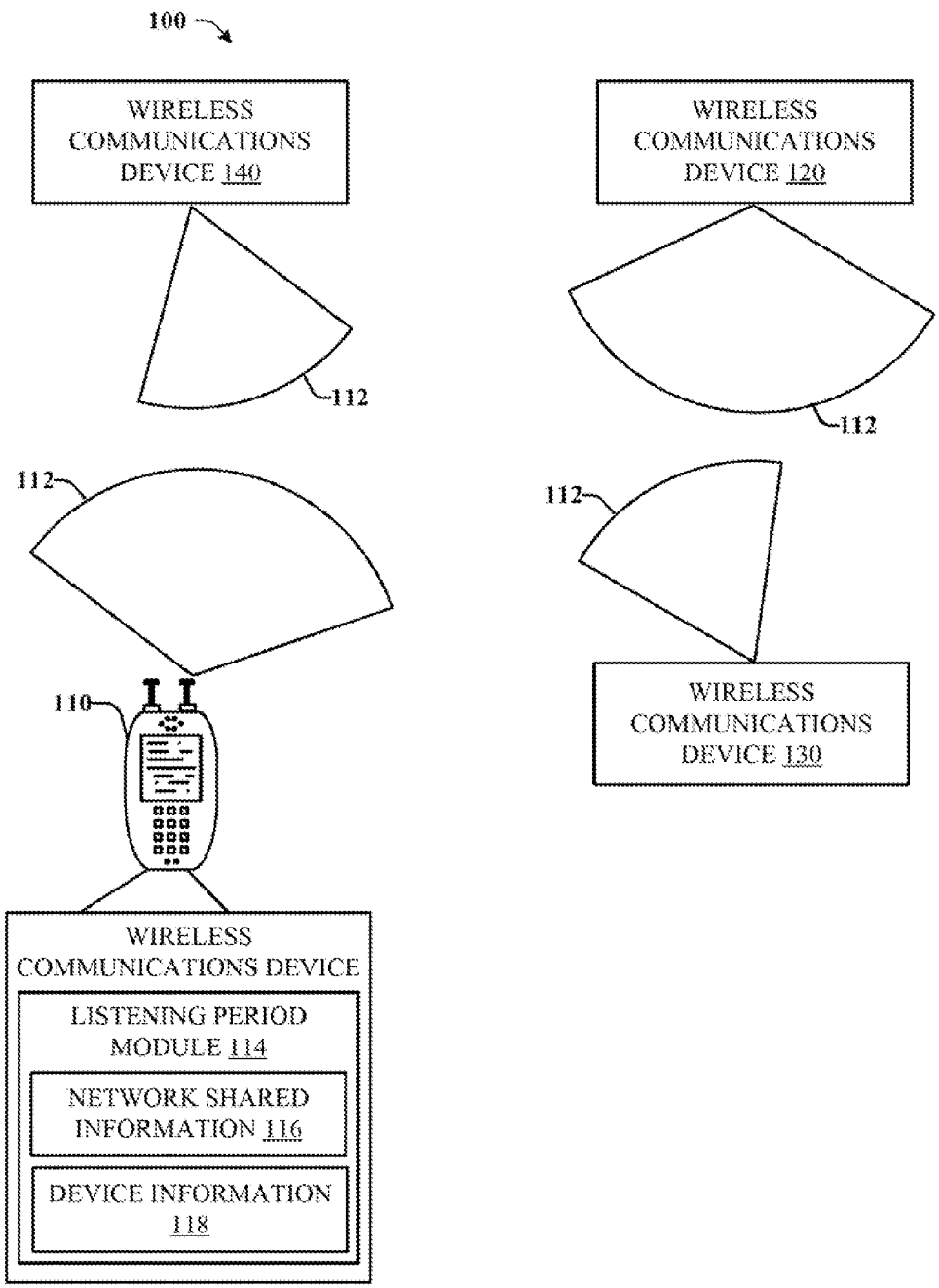
FIG. 1 illustrates a block diagram of a communication network according to an aspect.

In accordance with common practice, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of methods and apparatus are described more fully hereinafter with reference to the accompanying drawings. These methods and apparatus may, however, be embodied in many different forms and should not be construed as limited to any specific structure or function presented throughout this disclosure. Rather, these aspects are provided so that this disclosure will be thorough and complete, and will fully convey the scope of these methods and apparatus to those skilled in the art. Based on the descriptions herein teachings herein one skilled in the art should appreciate that that the scope of the disclosure is intended to cover any aspect of the methods and apparatus disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure herein may be embodied by one or more elements of a claim.

Generally, multiple apparatuses may seek to communicate with one another in a directionally based manner. Directionally based communications may refer to use of directional antennas at a transmitter and receiver to obtain beamforming gains. According to equation (1), (e.g., Friis equation):

$$P_{RX} = \frac{G_{TX} G_{RX} c^2}{(4\pi d)^2 f_c^2} \times \frac{1}{\sigma \cdot N_f} P_{TX} \qquad (1)$$

Receive power ($P_{RX}$) and hence the received signal-to-noise ratio at the receiver may be proportional to the product of antenna gains at the transmitter $G_{TX}$ and the receiver $G_{RX}$. At high frequencies, such as 60 GHz, signal attenuation may be large and a high beamforming gains (e.g., of the order of 20 dB) may be used for line-of-sight (LOS) communication even over a small range, such as 10 meters.

At high frequencies, where signal attenuation may be relatively severe, communications may be directional in nature and may use beamforming (e.g., beam training) to increase gains. As such, an AP may stratify the following responsibilities to be effective. The AP may have a large sector bound (e.g., a wide steering capability). The AP may have a large beamforming gain (e.g., multiple antennas). The AP may be mounted so that a line of sight path exists to most areas in a network, such as on a ceiling. The AP may use a steady power supply for periodic beacon transmissions and other management functions.

A network control option may be a contention based protocol such as the one used in 802.11. For example, 802.11 ad/ac/a/b/g/n. In a carrier sense multi-access (CSMA) based protocol, a STA may sense a medium and may transmit a packet or a request to transmit packet. If the STA detects a collision and/or the STA does not receive an acknowledgement from the intended receiver, the STA may back off for a random period of time. This backoff period may increase with each successive failure and/or non-response.

Additionally, traditional 802.11a, and b protocols may employ an omni-directional Medium Access Control (MAC) protocol, where every receiver may receive a packet and/or detect a collision. By contrast, in a directional MAC, a receiver may be unaware whether a transmitter has sent a packet if it is not receiving in the direction of the packet/request being sent by the transmitting STA. This lack of awareness may be referred to as a deafness problem in a directional MAC.

This deafness problem may happen when the receiver, e.g., STA B, is actively communicating with STA A in another direction. In such an aspect, repeated attempts by STA C to communicate with either STA A or B may create a large backoff at STA C. Further, when STA B is ready to receive, STA C may have its backoff counter set overly large thereby creating unnecessary delay in packet transmission. In other words, the deafness problem is a result of a transmitting STA not being aware when a corresponding receiver may be ready to receive in a receive direction and/or directions that include the direction of communication with the transmitting STA.

Deafness may also limit attempts for a contention based directional MAC protocol as receiving in a particular beam direction may make a STA deaf in other directions. As such, a STA may even become deaf to an attempt for a channel reservation by other STAs in the network.

Several aspects of a wireless network will now be presented with reference to FIG. 1. The wireless communication system 100 is shown with several wireless apparatuses, generally designated as apparatuses 110, 120, 130 and 140, wherein the several apparatuses 110, 120, 130 and 140 may communicate using a directionally based protocol which allows communicates within a defined coverage region 112. As used herein, wireless apparatuses 110, 120, 130 and 140 may be referred to as wireless communications devices (WCDs), user equipments (UEs), laptops, STAs, etc. Each wireless apparatus is capable of receiving and/or transmitting. In the detailed description that follows, the term "access point" may be used to designate a transmitting apparatus and the term "access terminal" may be used to designate a receiving apparatus for downlink communications, whereas the term "access point" is used to designate a receiving apparatus and the term "access terminal" is used to designate a transmitting apparatus for uplink communications. However, those skilled in the art will readily understand that other terminology or nomenclature may be used for an access point and/or access terminal. By way of example, an access point may be referred to as a base station, a base transceiver station, a station, a terminal, an apparatus, an access terminal acting as an access point, a WLAN device, or some other suitable terminology. An access terminal may be referred to as a user terminal, a mobile station, a subscriber station, a STA, a wireless device, a terminal, an apparatus, a node, or some other suitable terminology. The various concepts described throughout this disclosure are intended to apply to all suitable wireless apparatuses regardless of their specific nomenclature.

The wireless communication system 100 may support access terminals distributed throughout a geographic region. An access terminal, which may be fixed or mobile, may use backhaul services of an access point or engage in peer-to-peer communications with other access terminals. Examples of access terminals include a telephone (e.g., cellular telephone), a laptop computer, a desktop computer, a Personal Digital Assistant (PDA), a digital audio player (e.g., MP3 player), a camera, a game console, or any other suitable wireless apparatus.

Generally, as depicted in FIG. 1, multiple wireless apparatuses 110, 120, 130 and 140 may be distributed throughout a geographic region in such a manner than no one wireless apparatus may communication with all other apparatuses. For example, WCD 140 may communicate with WCD 110 and WCD 130 but not WCD 120. Further, each wireless apparatus may have a different coverage region 112 over which it may communicate. For example, WCD 140 may have small coverage region than WCD 110.

In operation, a peer-to-peer network may be established between multiple wireless apparatuses. For example WCD 110 may be actively communicating with WCD 120 (e.g., a laptop may be downloading files to a printer). Since WCD 110 and WCD 120 are communicating, their receive and transmit beams may be focused towards each other. If during this time, WCD 130 attempts to communicate with WCD 120, WCD 120 may not receive a request from WCD 130 (e.g., WCD 120 may be deaf to communication attempts by WCD 130). To avoid unwanted delays associated with WCD 130 performing repeated backoffs, a directional MAC protocol may be used where there may be recurring time periods (herein referenced to as listening periods (LPs) and or silence periods). Further discussion of listening periods, beacon and superframe are provided with reference to FIGS. 3 and 4.

Furthermore, WCD 110 may include listening period module 114. Listening period module 114 may be operable to stop WCD 110 from transmitting, switch to a receive mode and listen for a control message from peer WCDs over broad range of directions. The broadness of the directions may be determined by the antenna capabilities of the WCD 110 and the manner in which the listening is performed. For example, listening may be performed using (quasi) omni directional antenna, and/or by rotating a receive beam in all possible directions (herein called a lighthouse listening mode). In one aspect, WCD 110 may listen for a reference signal transmission. In one such aspect, listening may be performed by WCD 110 applying a broad coverage focus over a coverage region defined by multidirectional/quasi-omni directional antenna associated with WCD 110. In another such aspect, listening may be performed by WCD 110 sweeping a coverage region in a lighthouse fashion defined by multidirectional/quasi-omni directional antenna associated with WCD 110.

Further, in one aspect, transmissions may be categorized as essential and non-essential. In such an aspect, essential transmissions may be defined as a minimum amount of information, especially control information that may be exchanged to keep the connection active. For example, a channel access protocol may prompt a WCD (e.g., STA) to maintain its essential transmission during some part of its listening period through transmitting short control messages such as, requests, responses or acknowledgements.

Further, WCD 110 and 120 may share reference signal transmission responsibilities (e.g., both WCD 110 and WCD 120 may transmit a reference signal while assuring the reference signal transmission timing avoids collisions.) In such an aspect, transmission of a reference signal may include both network shared information 116, such as listening period timing, and device specific information 118, such as a device identifier, timestamp, etc. Through such reference signal transmissions, peer WCDs seeking to initiate data transmission to a WCD associated with a network may the WCDs LP.

In one aspect, listening period module 114 may be operable to subdivide a listening period a variety of ways. For example, in one kind of division, a LP may be divided into separate request and response periods or request, response and confirm periods. As such a WCD may send a request message in request sub period, a response message in a response sub period and/or an acknowledgement message in a confirm period. In another kind of division, a LP may be divided into time slots to avoid collisions and a WCD may select one of the time slots to complete a control message transmission. Such a process may ensure a slotted ALOHA performance rather than a ALOHA performance for transmission of control messages in LP. Further, the above described subdivision schemes mixed and/or combined. For example, a common LP may be divided into request and response periods with each of these periods is subdivided into time slots.

Further, listening period module 114 may be operable to obtain time synchronization information. Such time synchronization information allows multiple WCDs associated with a network to operable with different known LPs. In one aspect, a network may use associated devices to transmit a beacon that contains timestamp information and each WCD may synchronize its internal clock to that beacon signal. In another aspect, a WCD may send a probe request message upon entering a network, where such a message including timing information for the requesting WCD, and devices in the network may synchronize with the timing information. In yet another aspect, a third entity (e.g., a GPS based, etc.) may broadcast time synchronization information can be used by WCDs in the network to synchronize their internal clock.

The wireless communication system 100 may support MIMO technology. Using MIMO technology, multiple WCDs may communicate simultaneously using Spatial Division Multiple Access (SDMA). SDMA is a multiple access scheme which enables multiple streams transmitted to different receivers at the same time to share the same frequency channel, or communicate using different frequencies, and, as a result, provide higher user capacity. This is achieved by spatially precoding each data stream and then transmitting each spatially precoded stream through a different transmit antenna on the downlink. The spatially precoded data streams arrive at the access terminals with different spatial signatures, which enables each WCD 110, 130 to recover the data stream destined for that WCD 110, 130. On the uplink, each WCD 110, 130 transmits a spatially precoded data stream, which enables the identity of the source of each spatially precoded data stream to be known.

One or more WCD 110 may be equipped with multiple antennas to enable certain functionality. With this configuration, multiple antennas at the WCD 110 may be used to communicate to improve data throughput without additional bandwidth or transmit power. This may be achieved by splitting a high data rate signal at the transmitter into multiple lower rate data streams with different spatial signatures, thus enabling the receiver to separate these streams into multiple channels and properly combine the streams to recover the high rate data signal.

While portions of the following disclosure will describe WCDs that also support MIMO technology, the WCD 110 may also be configured to support WCDs that do not support MIMO technology. This approach may allow older versions of WCDs (e.g., "legacy" terminals) to remain deployed in a wireless network, extending their useful lifetime, while allowing newer MIMO WCDs to be introduced as appropriate.

In the detailed description that follows, various aspects of the disclosure will be described with reference to a MIMO system supporting any suitable wireless technology, such as Orthogonal Frequency Division Multiplexing (OFDM). OFDM is a spread-spectrum technique that distributes data over a number of subcarriers spaced apart at precise frequencies. The spacing provides "orthogonality" that enables a receiver to recover the data from the subcarriers. An OFDM system may implement IEEE 802.11, for example 802.11 ad/ac/a/b/g/n, or some other air interface standard. Other suitable wireless technologies include, by way of example, Code Division Multiple Access (CDMA). Time Division Multiple Access (TDMA), or any other suitable wireless technology, or any combination of suitable wireless technologies. A CDMA system may implement with IS-2000, IS-95, IS-856, Wideband-CDMA (WCDMA), or some other suitable air interface standard. A TDMA system may implement Global System for Mobile Communications (GSM) or some other suitable air interface standard. As those skilled in the art will readily appreciate, the various aspects of this invention are not limited to any particular wireless technology and/or air interface standard.

The wireless apparatus (e.g., 110, 130), whether an access point or WCD, may be implemented with a protocol that utilizes a layered structure that includes a physical (PHY) layer that implements all the physical and electrical specifications to interface the wireless apparatus to the shared wireless channel, a MAC layer that coordinates access to the shared wireless channel, and an application layer that performs various data processing functions including, by way of example, speech and multimedia codecs and graphics processing. Further discussion of the MAC and PHY layers is provided with reference to FIG. 3. Additional protocol layers (e.g., network layer, transport layer) may be required for any particular application. In some configurations, the wireless apparatus may act as a relay point between an access point and access terminal, or two access terminals, and therefore, may not require an application layer. Those skilled in the art will be readily able to implement the appropriate protocol for any wireless apparatus depending on the particular application and the overall design constraints imposed on the overall system.

Figure 2:
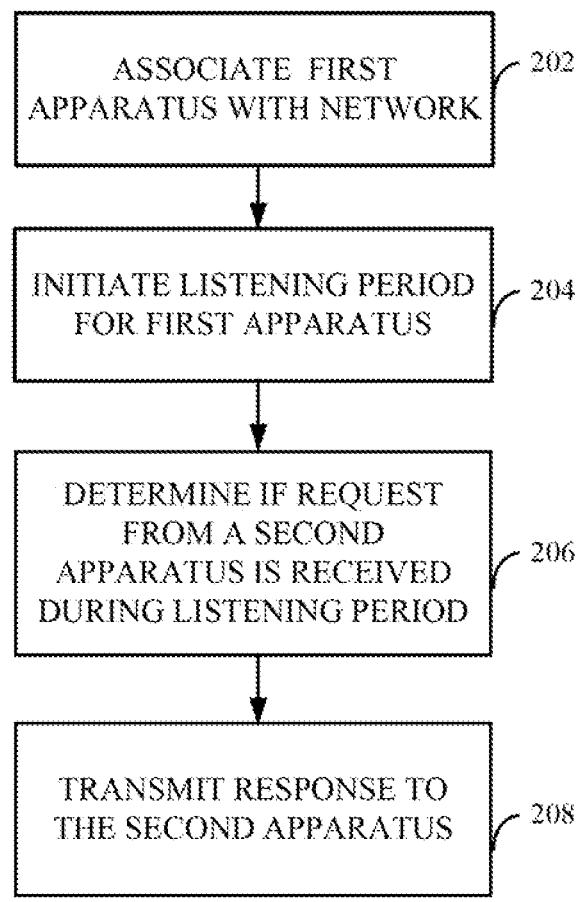
FIG. 2 is a flowchart of an aspect of a directional communication network for providing a silence period.

FIG. 2 illustrates various methodologies in accordance with the claimed subject matter. While, for purposes of simplicity of explanation, the methodologies are shown and described as a series of acts, it is to be understood and appreciated that the claimed subject matter is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

Referring to FIG. 2, a methodology 200 in a directional communication network for providing a silence period is illustrated. At reference numeral 202, a first apparatus may be associated with a network. In one aspect, the network may provide shared network information including information relating to other devices associated with the network, time synchronization information, etc. At reference numeral 204, the first apparatus may initiate a listening period, wherein each apparatus associated with the network may have a different known listening period. In one aspect, if the first apparatus is actively communicating with another apparatus, both apparatuses may cease communications during the first apparatus listening period. At reference numeral 206, the first apparatus determines if a request from a second apparatus is received during the listening period. Upon a determination that a request was received, at reference numeral 208 a response may be transmitted to the second apparatus. In one aspect, the response may include shared network information including information relating to other devices associated with the network, time synchronization information, etc., and device specific information such as a device identifier, internal timestamp, etc.

Thus, a first apparatus, associated with a network, may use a listening period to receive a request from a second apparatus, which with active communications where not already established, without unnecessary backoffs being performed by the second apparatus.

Figure 3:
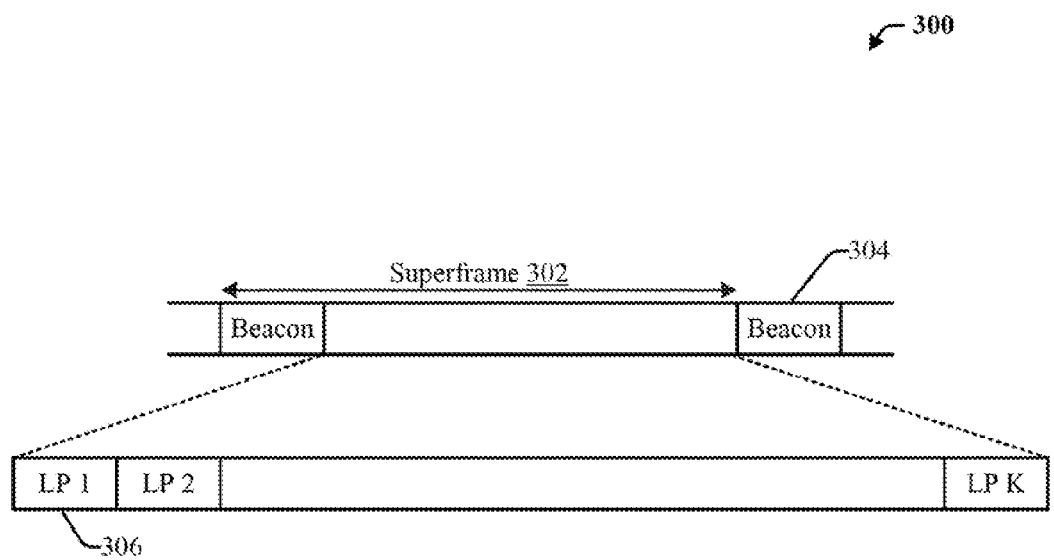
FIG. 3 illustrates a superframe block diagram with multiple listening period reservations within the superframe according to an aspect.

With reference to FIG. 3, an exemplary superframe block diagram 300 with multiple listening period reservations within the superframe is depicted. A period between successive beacon transmissions 304 may be refers to as a superframe 302. Further, within the superframe 302, listening periods 306 may be defined for each apparatus associated with the network transmitting the beacons. In other words, different STAs may have different LPs. As such, for example, if STA A and STA B are communicating with each other, they both may cease non-essential data transmission during LP of STA A and LP of STA B and may listen in all the receive directions for any transmission from other STAs. Continuing the example, if STA C is not transmitting data to any other device in the network, then STA C can send a packet to STA B requesting connection. In one aspect, an LP of one STA may be within the data transmission period of other STAs and so the data and control of different STAs may contend with each other for the transmission time. Such overlap may be useful when a directional channel access protocol is common for data and control.

In another aspect, an LP of a STA can be fixed every superframe or it may hop from one interval to another. In such an aspect, random hopping may useful so that two STAs do not repeatedly have their LP's overlap. Further, in such an aspect, a random hopping process may be achieved by, first computing a superframe number equal to a timestamp value then the next LP of the STA may be determined using a Hash function based on the computed value. Given the dependence of Hash function on Superframe number, the LP number of a given STA can change from one Superframe to the next so that same set of two STAs do not repeatedly have same LP. Further, If LPs of STA hop randomly from one superframe to the other, then a channel access protocol may be defined such that a STA B does not transmit anything during its LP and only listens in all its receive directions in its LP. In such an aspect, the LP acts as a complete silence period. In other words, to transmit a request message to STA A, STA B may wait until the LP of STA A does not coincide with LP of STA B. On the other hand, STA A may not send a response message in LP of STA A but rather, may send the response message in the LP of STA B. Such an aspect may assure a STA is available in its own LP, though at a cost of delay in establishing connections or reserving channels.

Figure 4:
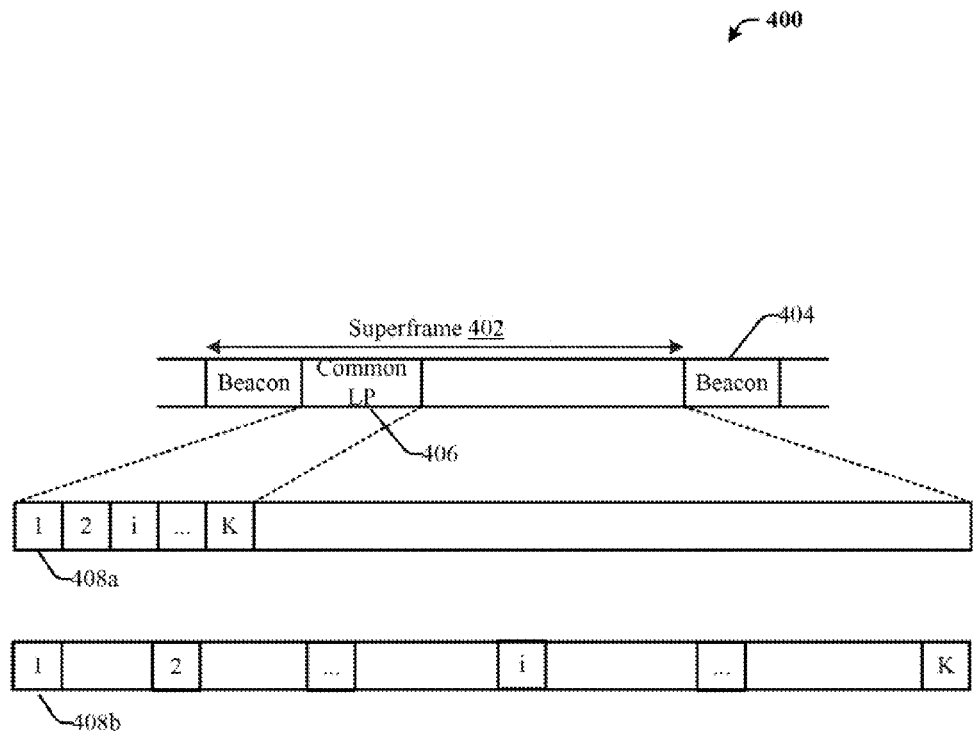
FIG. 4 illustrates another superframe block diagram with multiple listening period reservations within the superframe according to an aspect.

With reference to FIG. 4, another exemplary superframe block diagram 400 with multiple listening period reservations within the superframe is depicted. A period between successive beacon transmissions 404 may be referred to as a superframe 402. Further, within the superframe 402, a common listening period 406 may be defined, within which listening sub periods 408a may be defined for each apparatus associated with the network transmitting the beacons. In the depicted aspect, the superframe 402 duration may be divided into two parts: a common listening period 406 and a data and control period. In such an aspect, all STAs may share the common listening period 406. Further in such an aspect, a LP may transmit special control messages (e.g., essential communications) that may contend with control messages from other STAs. But if a STA is not transmitting any short control messages, it may be listening in all directions in quasi-directional, omni-directional or lighthouse fashion. In one aspect, as noted above, common listening period 406 may further subdivided into sub periods 408a, such that one of the sub periods may be a true silence period for one of the STAs in the network. In one aspect, a common listening period 406 may not be contiguous. For example, the common listening period may have non-contiguous sub periods 408b within a superframe. A STA may be enabled to send request to communicate in a few of these sub periods. In the other sub periods, the STA may respond to communications by any other STA transmitting a request. In another aspect, if STAs are allowed to transmit beacons, then STA may use beacon and/or a beacon like frame as a request in each of the sub periods to initiate communication with other STAs which may be in the listening mode.

In one operational example, a STA may initiate a listening period mode, where at least a portion of current communications may be ceased, and where the STA may be configured to avoid collisions from a beacon transmission of another STA. In one aspect, the other STA may include an access point of nearby networks. Further, in another aspect, the listening period mode may be configured by receiving an assignment and/or allocation from another STA defining when the receiving STA may cease at least a portion of communications.

Figure 5:
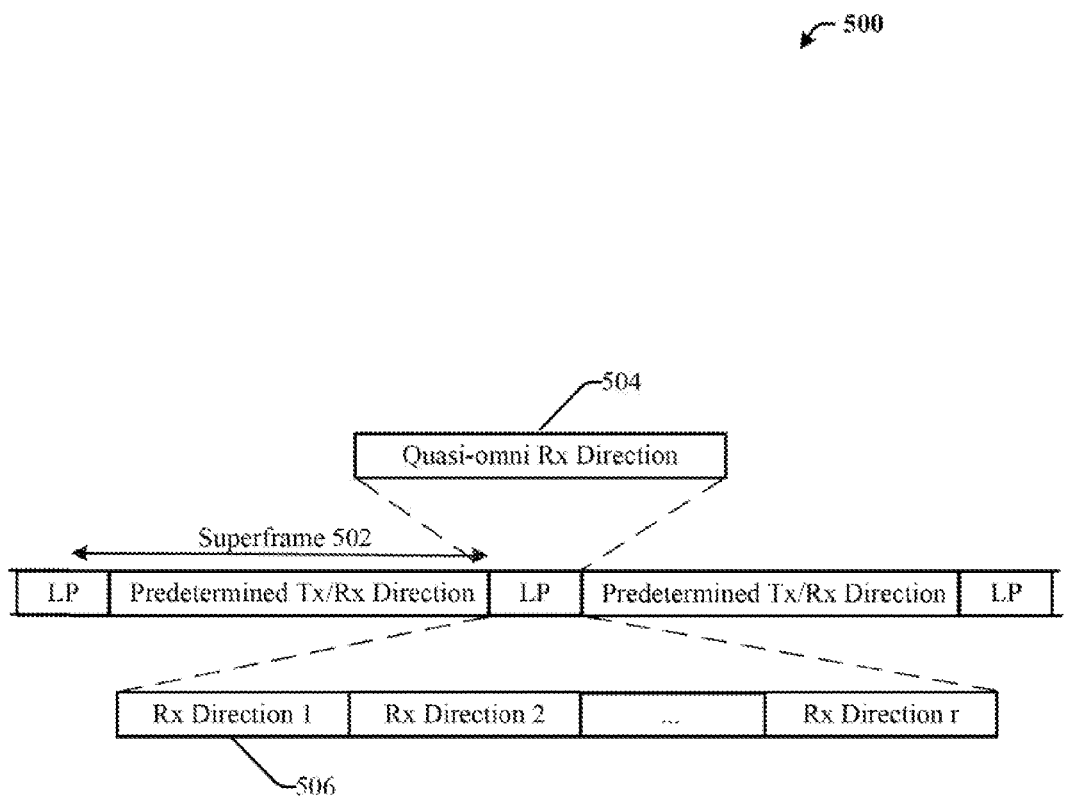
FIG. 5 illustrates another superframe block diagram with a quasi-omni directional and a rotational sweeping reception pattern within the superframe according to an aspect.

With reference to FIG. 5, an exemplary superframe block diagram 500 with various listening directions schemes is depicted. A period between successive beacon transmissions 504 may be refers to as a superframe 502. Further, the broadness of the listening directions may be determined by the antenna capabilities of the apparatus and the manner in which the listening is performed. For example, listening may be performed using (quasi) omni directional antenna 504, by rotating a receive beam in all possible directions 506 (herein called a lighthouse listening mode). In one aspect, an apparatus may listen for a reference signal transmission. In one such aspect, listening may be performed by an apparatus applying a broad scan over a coverage region defined by multidirectional/quasi-omni directional antenna 504 associated with the apparatus. In another such aspect, listening may be performed by sweeping a coverage region in a lighthouse fashion 506 defined by multidirectional/quasi-omni directional antenna associated with the apparatus.

Figure 6:
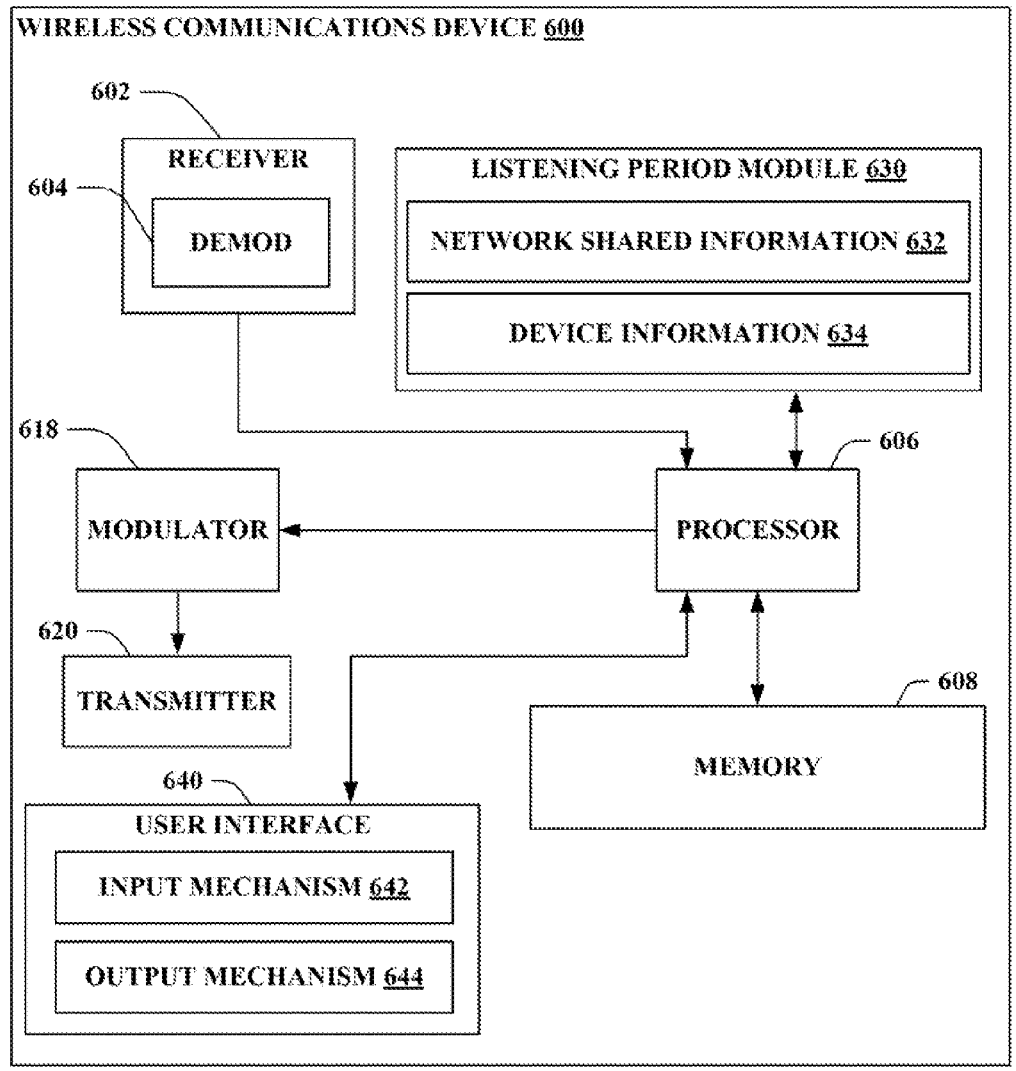
FIG. 6 illustrates a block diagram example architecture of a wireless communications device.

While still referencing FIG. 1, but turning also now to FIG. 6, an example architecture of wireless communications device 110 is illustrated. As depicted in FIG. 6, wireless communications device 600 comprises receiver 602 that receives a signal from, for instance, a receive antenna (not shown), performs typical actions on (e.g., filters, amplifies, downconverts, etc.) the received signal, and digitizes the conditioned signal to obtain samples. Receiver 602 can comprise a demodulator 604 that can demodulate received symbols and provide them to processor 606 for channel estimation. Further, receiver 602 may receive signals from multiple networks using multiple communication protocols. In one aspect, receiver 602 may receive a signal from a network using at least one of: CDMA, WCDMA, TDMA, TD-SCDMA, UMTS, IP, GSM, LTE, WiMax, UMB, EV-DO, 802.11, BLUETOOTH, etc.

Processor 606 can be a processor dedicated to analyzing information received by receiver 602 and/or generating information for transmission by transmitter 620, a processor that controls one or more components of wireless communications device 600, and/or a processor that both analyzes information received by receiver 602, generates information for transmission by transmitter 620, and controls one or more components of wireless communications device 600.

Wireless communications device 600 can additionally comprise memory 608 that is operatively coupled to, and/or located in, processor 606 and that can store data to be transmitted, received data, information related to available channels, data associated with analyzed signal and/or interference strength, information related to an assigned channel, power, rate, or the like, and any other suitable information for estimating a channel and communicating via the channel. Memory 608 can additionally store protocols and/or algorithms associated with estimating and/or utilizing a channel (e.g., performance based, capacity based, etc.).

It will be appreciated that data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ES-DRAM), Synchlink DRAM (SLDRAM), and direct Rambus RAM (DRRAM). Memory 608 of the subject systems and methods may comprise, without being limited to, these and any other suitable types of memory.

Wireless communications device 600 can further include listening period module 630 may be operable to stop WCD 600 from transmitting, switch to a receive mode and listen for a control message from peer WCDs over broad range of directions. Listening period module 630 may include network shared information 632 and device specification information 634. In one an aspect, common (e.g., shared) information 632 may include, timestamp information, reference signal intervals, peer-to-peer network identifiers, channel access protocol information, listening period information for each WCD associated with the network, etc. Further, in another aspect, device specific information 634 may include a device identifier, a neighbor list, etc.

Additionally, wireless communications device 600 may include user interface 640. User interface 640 may include input mechanisms 642 for generating inputs into communications device 600, and output mechanism 642 for generating information for consumption by the user of the communications device 600. For example, input mechanism 642 may include a mechanism such as a key or keyboard, a mouse, a touch-screen display, a microphone, etc. Further, for example, output mechanism 644 may include a display, an audio speaker, a haptic feedback mechanism, a Personal Area Network (PAN) transceiver etc. In the illustrated aspects, the output mechanism 644 may include a display operable to present media content that is in image or video format or an audio speaker to present media content that is in an audio format.

Figure 7:
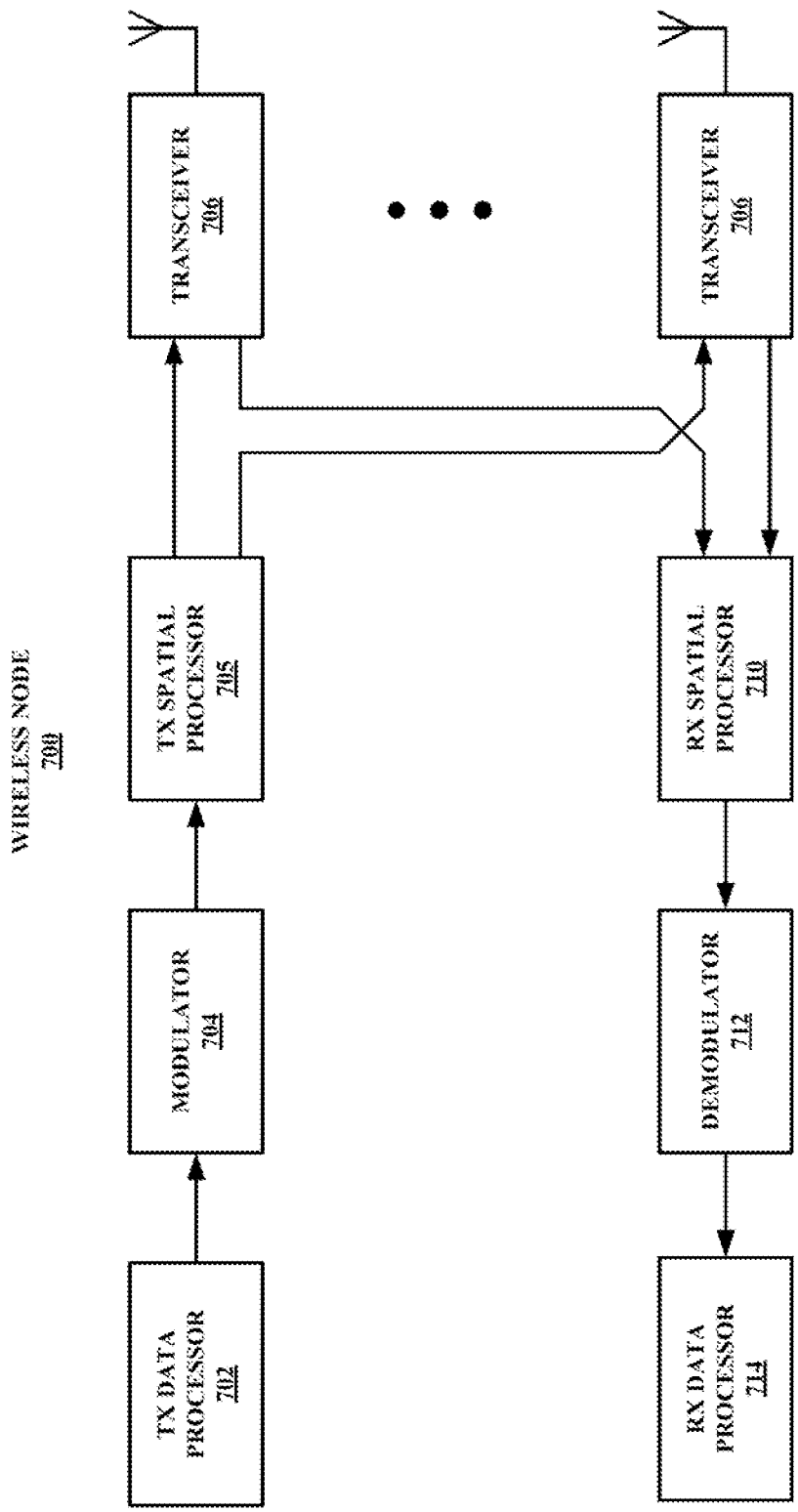
FIG. 7 illustrates another block diagram example architecture of a wireless node.

FIG. 7 is a conceptual block diagram illustrating an example of the signal processing functions of the PHY layer. In a transmit mode, a TX data processor 702 may be used to receive data from the MAC layer and encode (e.g., Turbo code) the data to facilitate forward error correction (FEC) at the receiving apparatus. The encoding process results in a sequence of code symbols that that may be blocked together and mapped to a signal constellation by the TX data processor 702 to produce a sequence of modulation symbols.

In wireless apparatuses, the modulation symbols from the TX data processor 702 may be provided to a modulator 704 (e.g., an OFDM modulator). The modulator splits the modulation symbols into parallel streams. Each stream is then mapped to a subcarrier and then combined together using an Inverse Fast Fourier Transform (IFFT) to produce a time domain stream.

A TX spatial processor 706 performs spatial processing on the stream. This may be accomplished by spatially precoding each stream and then providing each spatially precoded stream to a different antenna 708 via a transceiver 706. Each transmitter 706 modulates an RF carrier with a respective precoded stream for transmission over the wireless channel.

In a receive mode, each transceiver 706 receives a signal through its respective antenna 708. Each transceiver 706 may be used to recover the information modulated onto an RF carrier and provide the information to a RX spatial processor 710.

The RX spatial processor 710 performs spatial processing on the information to recover any spatial streams destined for the wireless node 700. The spatial processing may be performed in accordance with Channel Correlation Matrix Inversion (CCMI), Minimum Mean Square Error (MMSE), Soft Interference Cancellation (SIC), or some other suitable technique. If multiple spatial streams are destined for the wireless node 700, they may be combined by the RX spatial processor 710.

In wireless nodes, the stream (or combined stream) from the RX spatial processor 710 is provided to a demodulator 712 (e.g., an OFDM demodulator). The demodulator 712 converts the stream (or combined stream) from time-domain to the frequency domain using a Fast Fourier Transform (FFT). The frequency domain signal comprises a separate stream for each subcarrier of the signal. The demodulator 712 recovers the data (i.e., modulation symbols) carried on each subcarrier and multiplexes the data into a stream of modulation symbols.

A RX data processor 714 may be used to translate the modulation symbols back to the correct point in the signal constellation. Because of noise and other disturbances in the wireless channel, the modulation symbols may not correspond to an enact location of a point in the original signal constellation. The RX data processor 714 detects which modulation symbol was most likely transmitted by finding the smallest distance between the received point and the location of a valid symbol in the signal constellation. These soft decisions may be used, in the case of Turbo codes, for example, to compute a Log-Likelihood Ratio (LLR) of the code symbols associated with the given modulation symbols. The RX data processor 714 then uses the sequence of code symbol LLRs in order to decode the data that was originally transmitted before providing the data to the MAC layer.

Figure 8:
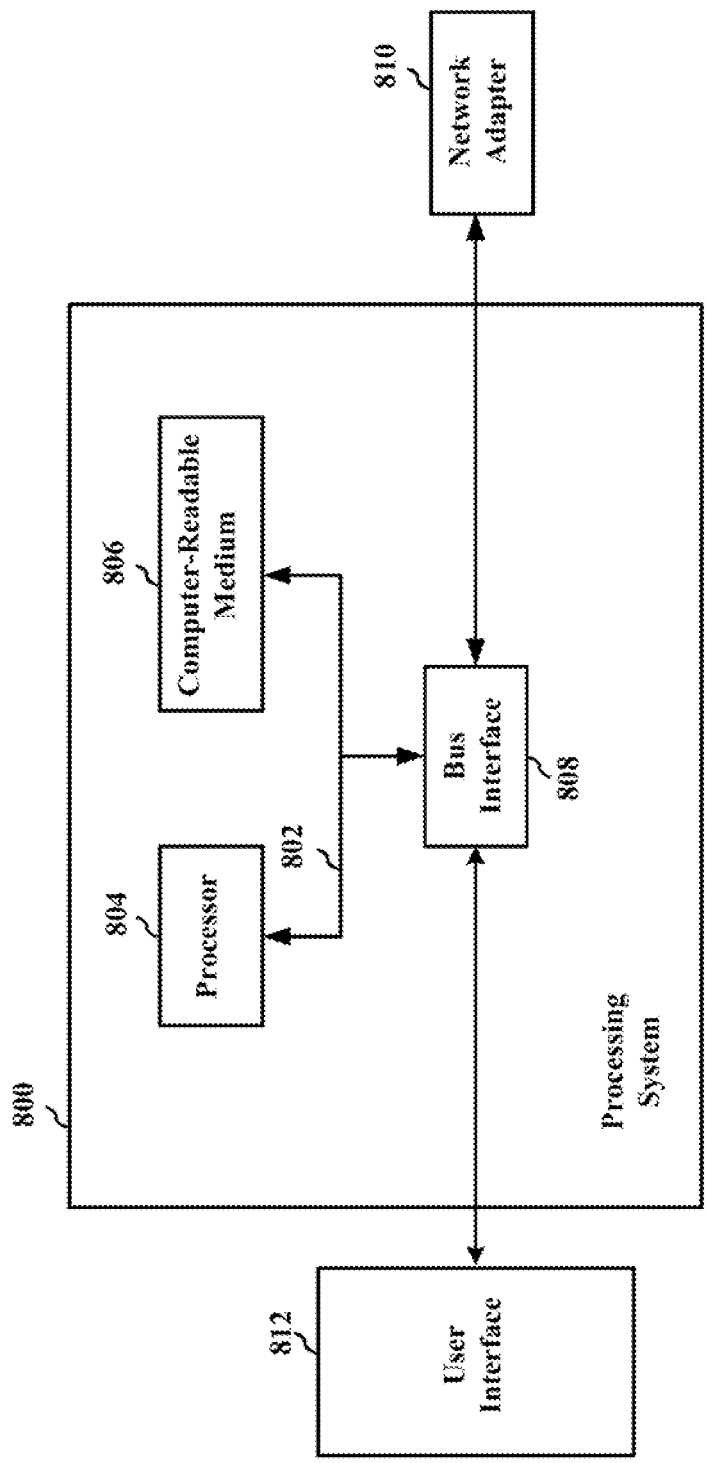
FIG. 8 illustrates a conceptual diagram illustrating an example of a hardware configuration for a processing system in a wireless node.

FIG. 8 is a conceptual diagram illustrating an example of a hardware configuration for a processing system in a wireless node. In this example, the processing system 800 may be implemented with a bus architecture represented generally by bus 802. The bus 802 may include any number of interconnecting buses and bridges depending on the specific application of the processing system 800 and the overall design constraints. The bus links together various circuits including a processor 804, computer-readable media 806, and a bus interface 808. The bus interface 808 may be used to connect a network adapter 810, among other things, to the processing system 800 via the bus 802. The network interface 810 may be used to implement the signal processing functions of the PHY layer. In the case of a WCD 110 (see FIG. 1), a user interface 812 (e.g., keypad, display, mouse, joystick, etc.) may also be connected to the bus via the bus interface 808. The bus 802 may also link various other circuits such as timing sources, peripherals, voltage regulators, power management circuits, and the like, which are well known in the art, and therefore, will not be described any further.

The processor 804 is responsible for managing the bus and general processing, including the execution of software stored on the computer-readable media 808. The processor 808 may be implemented with one or more general-purpose and/or special-purpose processors. Examples include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure.

One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, or any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials.

In the hardware implementation illustrated in FIG. 8, the computer-readable media 806 is shown as part of the processing system 800 separate from the processor 804. However, as those skilled in the art will readily appreciate, the computer-readable media 806, or any portion thereof, may be external to the processing system 800. By way of example, the computer-readable media 806 may include a transmission line, a carrier wave modulated by data, and/or a computer product separate from the wireless node, all which may be accessed by the processor 804 through the bus interface 808. Alternatively, or in addition to, the computer readable media 804, or any portion thereof, may be integrated into the processor 804, such as the case may be with cache and/or general register files.

The processing system, or any part of the processing system, may provide the means for performing the functions recited herein. By way of example, the processing system executing code may provide the means for initiating, by a first apparatus, a listening period mode, wherein the listening period mode comprises means for ceasing at least a portion of current communication and means for configuring to receive a request to communicate, means for determining whether a request from a second apparatus is received during a time period in the listening period mode, and means for transmitting a response if the request to communicate from the second apparatus is received during the time period in the listening period mode. Alternatively, the code on the computer-readable medium may provide the means for performing the functions recited herein.

Figure 9:
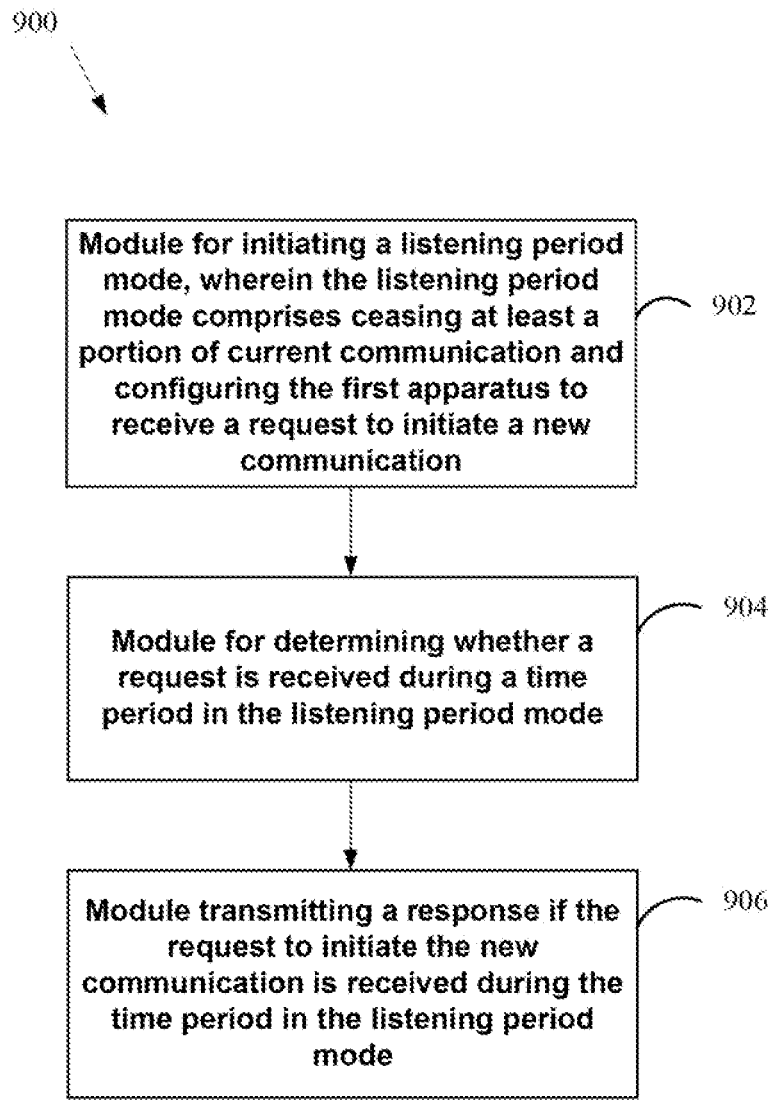
FIG. 9 is a conceptual block diagram illustrating the functionality of an exemplary apparatus.

FIG. 9 is a conceptual block diagram 900 illustrating the functionality of an exemplary apparatus 800. The apparatus 800 includes a module 902 that initiates a listening period mode, wherein the listening period mode comprises ceasing at least a portion of current communication and configuring to receive a request to initiate a new communication, a module 904 that determines whether a request is received during a time period in the listening period mode, and a module 906 that transmits a response if the request to initiate the new communication is received during the time period in the listening period mode.

Referring to FIG. 1 and FIG. 8, in one configuration, the apparatus 800 for wireless communication includes means for initiating, by a first apparatus, a listening period mode, wherein the listening period mode comprises means for ceasing at least a portion of current communication and means for configuring the first apparatus to receive a request to initiate a new communication, means for determining whether a request is received during a time period in the listening period mode, and means for transmitting a response if the request to initiate the new communication is received during the time period in the listening period mode. In another configuration, the apparatus 800 for wireless communication includes means for initiating the new communication during at least one of the one or more time periods specified in the received request. In another configuration, the apparatus 800 for wireless communication the means for transmitting further includes means for initiating the new communication during at least one of the one or more time periods specified in the received request. In another configuration, the apparatus 800 for wireless communication the means for transmitting further includes means for transmitting during the listening period mode of either the first apparatus or during a listening period of a second apparatus. In another configuration, the apparatus 800 for wireless communication includes means for associating, by the first apparatus, with a network in which listening mode information of the first apparatus is being used. In another configuration, the apparatus 800 for wireless communication the means for transmitting further includes means for transmitting the listening mode information to the second apparatus to allow the second apparatus to associate with the network without selecting an overlapping listening period mode. In another configuration, the apparatus 800 for wireless communication includes means for broadcasting the listening mode information using a beacon transmission by the first apparatus. In another configuration, the apparatus 800 for wireless communication includes means for receiving a probe request from a second apparatus, and means for transmitting the listening mode information using a probe response by the first apparatus in response to the probe request received from the second apparatus. In another configuration, the apparatus 800 for wireless communication includes means for receiving time synchronization information from a second apparatus associated with the network, and wherein the second apparatus obtains the time synchronization information through a GPS based protocol. In another configuration, the apparatus 800 for wireless communication the means for configuring further includes means for using a quasi-omni directional receive antenna, wherein the quasi-omni directional antenna is operable to receive over an arc region defined by the first apparatus. In another configuration, the apparatus 800 for wireless communication the means for configuring further includes means for receiving by rotating a receiving beam of a receive antenna of the first apparatus, wherein the receive antenna is operable to change beam directions. The aforementioned means is the processing system 800 configured to perform the functions recited by the aforementioned means. As described supra, the processing system 800 includes the TX Processor 716, the RX Processor 770, and the controller/processor 775. As such, in one configuration, the aforementioned means may be the TX Processor 716, the RX Processor 770, and the controller/processor 775 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. A claim that recites at least one of a combination of elements (e.g., "at least one of A, B, or C") refers to one or more of the recited elements (e.g., A, or B, or C, or any combination thereof). All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

What is claimed is:

1. A method for wireless communications, comprising:
receiving, by a first apparatus, information from a network defining a superframe duration, wherein the superframe is a time interval between beacon transmissions;
receiving an assignment of a listening period from the network, wherein the listening period comprises a portion of the superframe;
broadcasting, by the first apparatus, information regarding the listening period using a beacon transmission;
initiating, by the first apparatus, the listening period, wherein during the listening period the first apparatus is configured to cease a current directional communication and listen in an omni-directional manner for a request to initiate a new communication;
determining whether the request is received during the listening period; and
transmitting a response if the request to initiate the new communication is received during the listening period.

2. The method of claim 1, wherein the received request further comprises a broadcast beacon.

3. The method of claim 2, wherein the transmitting comprises transmitting the response to the broadcast beacon when the first apparatus is in a non-listening period.

4. The method of claim 1, wherein the transmitting comprises transmitting during the listening period of either the first apparatus or during a listening period of a second apparatus.

5. The method of claim 1, wherein the transmitting comprises transmitting the listening period information to a second apparatus to allow the second apparatus to associate with the network without selecting an overlapping listening period.

6. The method of claim 1, wherein the listening period information comprises a number of apparatuses associated with the network and listening period times and lengths for each associated apparatus.

7. The method of claim 1, wherein the listening period information further comprises device identifying information of the first apparatus.

8. The method of claim 1, further comprising:
receiving a probe request from a second apparatus; and
transmitting the listening period information using a probe response by the first apparatus in response to the probe request received from the second apparatus.

9. The method of claim 1, further comprising receiving time synchronization information from a second apparatus associated with the network, and wherein the second apparatus had obtained the time synchronization information through a GPS based protocol.

10. The method of claim 1, wherein the configuring the first apparatus to listen in an omni-directional manner for the request comprises using a quasi-omni directional antenna, wherein the quasi-omni directional antenna is operable to receive over an arc region defined by the first apparatus.

11. The method of claim 1, wherein the configuring the first apparatus to listen in an omni-directional manner comprises receiving by rotating a receiving beam of a receive antenna of the first apparatus, wherein the receive antenna is operable to change beam directions.

12. The method of claim 1, wherein a time period is defined for each apparatus associated with the network, and wherein the time period for each apparatus is included in the listening period information.

13. The method of claim 1, wherein the portion of the superframe is common to all apparatuses associated with the network.

14. The method of claim 1, wherein the listening period is assigned by the network: at a random portion of the superframe, by dividing the superframe into multiple subdivisions for request and response periods, or by dividing the superframe into multiple time slots.

15. The method of claim 1, wherein the response is transmitted using an IEEE 802.11 protocol.

16. The method of claim 1, wherein the current directional communication ceased comprises a transmission intended for a second apparatus.

17. The method of claim 1, wherein the listening period further comprises continuing transmission of another portion of current communication wherein the other portion comprises a response message generated in response to a request message received during the listening period.

18. The method of claim 1, wherein the directional communication to be ceased comprises all communications transmitted or received by the first apparatus.

19. A computer program product, comprising:
a tangible computer-readable storage device comprising code executable to:
receive, by a first apparatus, information from a network defining a superframe duration, wherein the superframe is a time interval between beacon transmissions;
receive an assignment of a listening period from the network, wherein the listening period comprises a portion of the superframe;
broadcast, by the first apparatus, information regarding the listening period using a beacon transmission;
initiate, by the first apparatus, the listening period, wherein during the listening period the first apparatus is configured to cease a current directional communication and listen in an omni-directional manner for a request to initiate a new communication;
determine whether the request is received during the listening period; and
transmit a response if the request to initiate the new communication is received during the listening period.

20. An apparatus for wireless communications, comprising:
means for receiving information from a network defining a superframe duration, wherein the superframe is a time interval between beacon transmissions;
means for receiving an assignment of a listening period from the network, wherein the listening period comprises a portion of the superframe;
means for broadcasting information regarding the listening period using a beacon transmission;
means for initiating the listening period, wherein during the listening period the apparatus is configured to cease a current directional communication and listen in an omni-directional manner for a request to initiate a new communication;
means for determining whether the request is received during the listening period; and
means for transmitting a response if the request to initiate the new communication is received during the listening period.

21. The apparatus of claim 20, wherein the received request further comprises a broadcast beacon.

22. The apparatus of claim 21, wherein the means for transmitting further comprises means for transmitting the response to the broadcast beacon when the apparatus is in a non-listening period.

23. The apparatus of claim 20, wherein the means for transmitting further comprises means for transmitting during the listening period of either the apparatus or during a listening period of another apparatus.

24. The apparatus of claim 20, wherein the means for transmitting further comprises means for transmitting the listening period information to another apparatus to allow the other apparatus to associate with the network without selecting an overlapping listening period.

25. The apparatus of claim 20, wherein the listening period information comprises a number of apparatuses associated with the network and listening period times and lengths for each associated apparatus.

26. The apparatus of claim 20, wherein the listening period information further comprises device identifying information of the apparatus.

27. The apparatus of claim 20, further comprising:
means for receiving a probe request from another apparatus; and
means for transmitting the listening period information using a probe response by the apparatus in response to the probe request received from the other apparatus.

28. The apparatus of claim 20, further comprising means for receiving time synchronization information from another apparatus associated with the network, and wherein the other apparatus had obtained the time synchronization information through a GPS based protocol.

29. The apparatus of claim 20, wherein the configuring to listen in an omni-directional manner further comprises using a quasi-omni directional antenna, wherein the quasi-omni directional antenna is operable to receive over an arc region defined by the apparatus.

30. The apparatus of claim 20, wherein the configuring to listen in an omni-directional manner further comprises receiving by rotating a receiving beam of a receive antenna of the apparatus, wherein the receive antenna is operable to change beam directions.

31. The apparatus of claim 20, wherein a time period is defined for each apparatus associated with the network, and wherein the time period for each apparatus is included in the listening period information.

32. The apparatus of claim 20, wherein the portion of the superframe is common to all apparatuses associated with the network.

33. The apparatus of claim 20, wherein the listening period is assigned by the network: at a random portion of the superframe, by dividing the superframe into multiple subdivisions for request and response periods, or by dividing the superframe into multiple time slots.

34. The apparatus of claim 20, wherein the listening period information is transmitted using an IEEE 802.11 protocol.

35. The apparatus of claim 20, wherein the current directional communication to be ceased comprises a transmission intended for another apparatus.

36. The apparatus of claim 20, further comprising means for continuing transmission of another portion of current communication, wherein the other portion comprises a response message generated in response to a request message received during a non-listening period.

37. The apparatus of claim 20, wherein the current directional communication to be ceased comprises all communications transmitted or received by the apparatus.

38. A station, comprising:
an antenna;
a processing system coupled with the antenna configured to:
receive information from a network defining a superframe duration, wherein the superframe is a time interval between beacon transmissions;
receive an assignment of a listening period from the network, wherein the listening period comprises a portion of the superframe;
initiate the listening period, wherein during the listening period the processor configures the station to cease a current directional communication and listen in an omni-directional manner for a request to initiate a new communication; and
determine whether the request is received during the listening period; and
a transmitter configured to:
transmit, via the antenna, a response if the request to initiate the new communication is received during the listening period; and broadcast, via the antenna, information regarding the listening period using a beacon transmission.

39. An apparatus for wireless communications, comprising:
a processing system configured to:
receive information from a network defining a superframe duration, wherein the superframe is a time interval between beacon transmissions;
receive an assignment of a listening period from the network, wherein the listening period comprises a portion of the superframe;
initiate a listening period, wherein during the listening period the apparatus is configured to cease current directional communication and listen in an omni-directional manner for a request to initiate a new communication; and
determine whether the request is received during the listening period; and
a transmitter configured to:
transmit a response if the request to initiate the new communication is received during the listening period; and
broadcast information regarding the listening period using a beacon transmission.

40. The apparatus of claim 39, wherein the received request further comprises a broadcast beacon.

41. The apparatus of claim 40, wherein the transmitter is configured to transmit the response to the broadcast beacon when the apparatus is in a non-listening period.

42. The apparatus of claim 39, wherein the transmitter is further configured to transmit during the listening period of either the apparatus or during a listening period of another apparatus.

43. The apparatus of claim 39, wherein the transmitter is further configured to transmit the listening period information to another apparatus to allow the other apparatus to associate with the network without selecting an overlapping listening period.

44. The apparatus of claim 39, wherein the listening period information comprises a number of apparatuses associated with the network and listening period times and lengths for each associated apparatus.

45. The apparatus of claim 39, wherein the listening period information further comprises device identifying information of the apparatus.

46. The apparatus of claim 39, further comprising a receiver configured to:
receive a probe request from another apparatus; and
wherein the transmitter is further configured to transmit the listening period information using a probe response by the apparatus in response to the probe request received from the other apparatus.

47. The apparatus of claim 39, further comprising a receiver configured to receive time synchronization information from another apparatus associated with the network, and wherein the other apparatus had obtained the time synchronization information through a GPS based protocol.

48. The apparatus of claim 39, further comprising a receiver configured to receive using a quasi-omni directional antenna, wherein the apparatus listens in an omni-directional manner using the receiver and the quasi-omni directional antenna is operable to receive over an arc region defined by the apparatus.

49. The apparatus of claim 39, further comprising a receiver configured to receive by rotating a receiving beam of a receive antenna of the apparatus, wherein the apparatus listens in an omni-directional manner using the receiver and the receive antenna is operable to change beam directions.

50. The apparatus of claim 39, wherein a time period is defined for each apparatus associated with the network, and wherein the time period for each apparatus is included in the listening period information.

51. The apparatus of claim 39, wherein the portion of the superframe is common to all apparatuses associated with the network.

52. The apparatus of claim 39, wherein the listening period is assigned by the network: at a random portion of the superframe, by dividing the superframe into multiple subdivisions for request and response periods, or by dividing the superframe into multiple time slots.

53. The apparatus of claim 39, wherein the transmitter is further configured to transmit using an IEEE 802.11 protocol.

54. The apparatus of claim 39, wherein the current directional communication to be ceased comprises a transmission intended for another apparatus.

55. The apparatus of claim 39, wherein the transmitter is further configured to continue transmission of another portion of current communication wherein the other portion comprises a response message generated in response to a request message received during a non-listening period.

56. The apparatus of claim 39, wherein the current directional communication to be ceased comprises all communications transmitted or received by the apparatus.

* * * * *